July 8, 1952　　　H. P. LUHN ET AL　　　2,602,545
DATA COMPARING APPARATUS
Filed Dec. 30, 1947　　　11 Sheets-Sheet 1
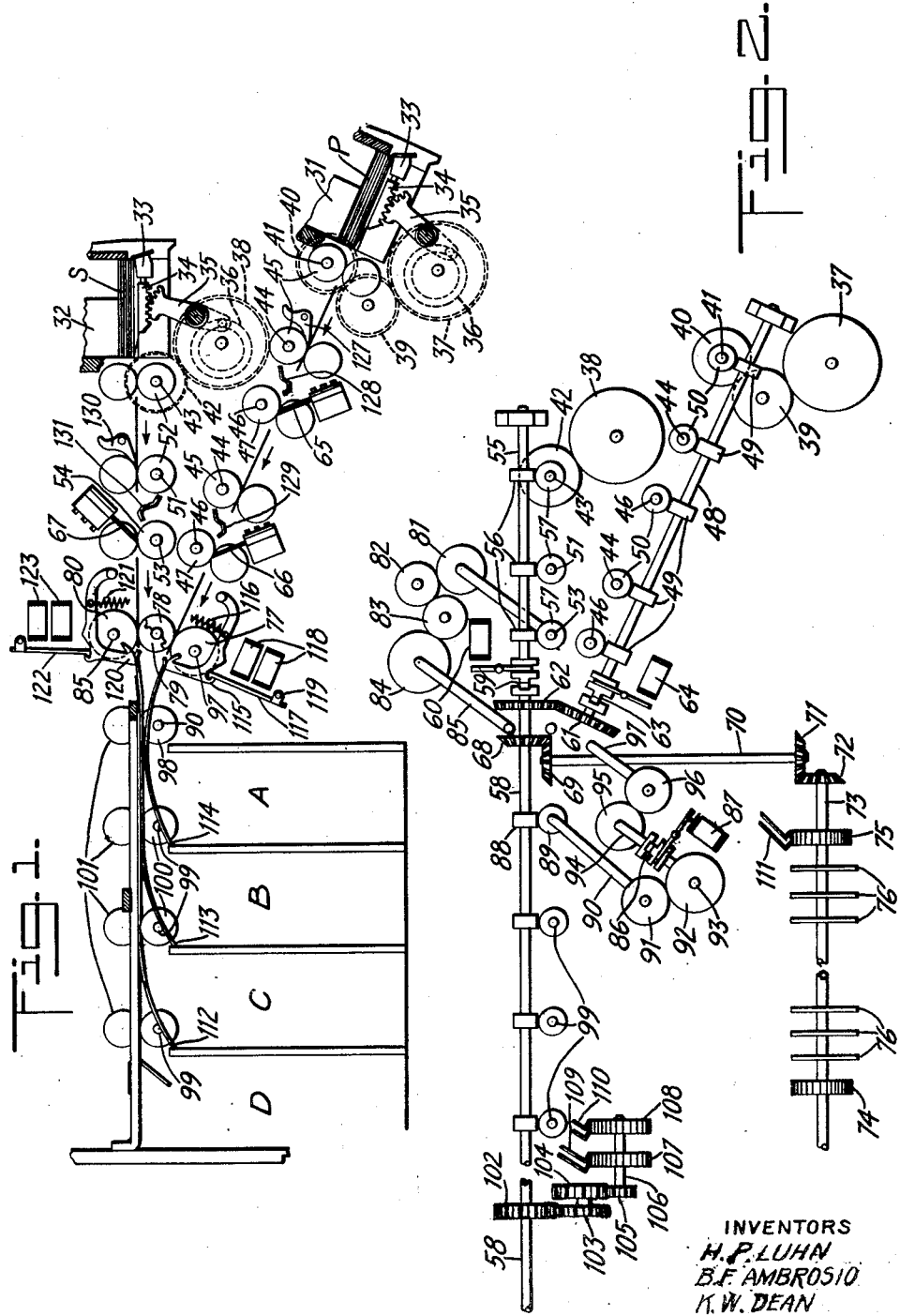
INVENTORS
H. P. LUHN
B. F. AMBROSIO
K. W. DEAN
BY J. B. Sponsler
AGENT

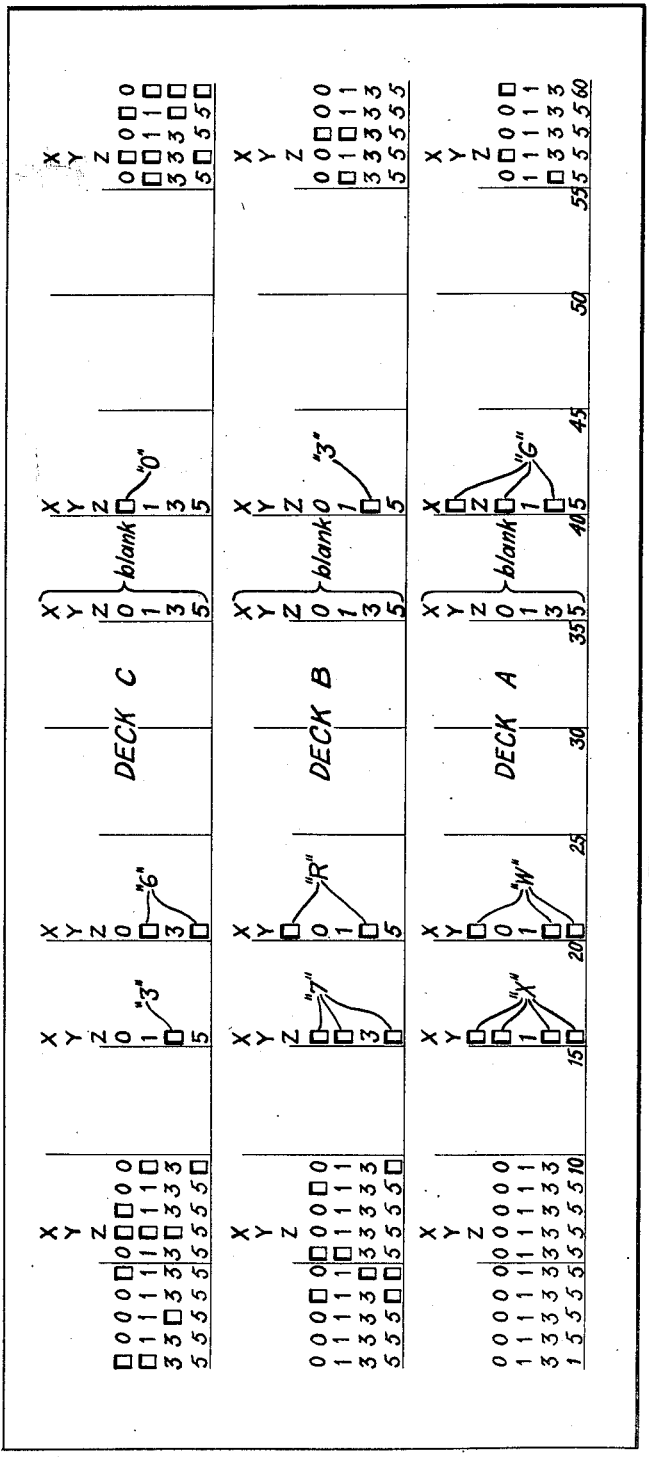

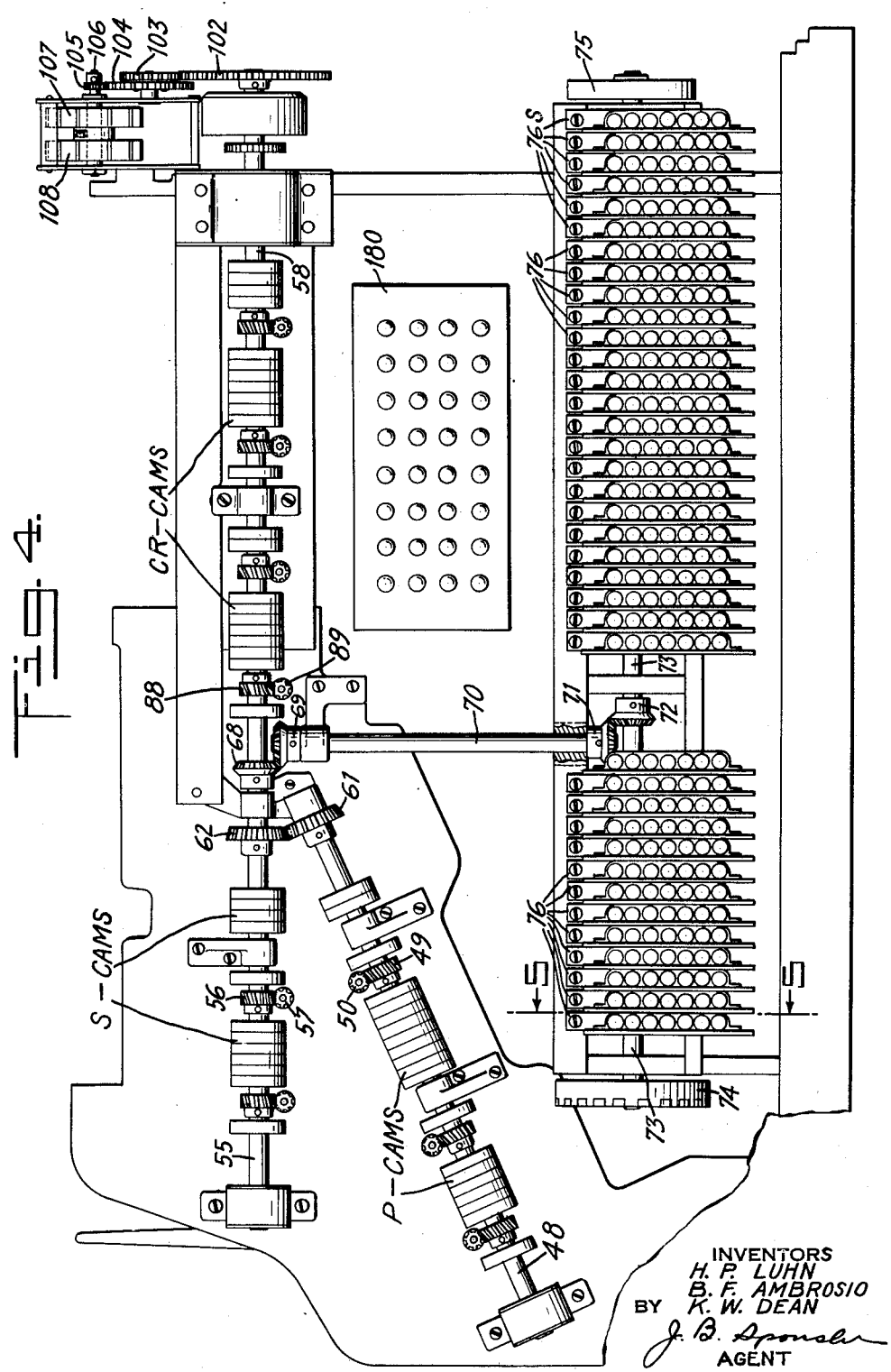

July 8, 1952 H. P. LUHN ET AL 2,602,545
DATA COMPARING APPARATUS
Filed Dec. 30, 1947 11 Sheets-Sheet 4
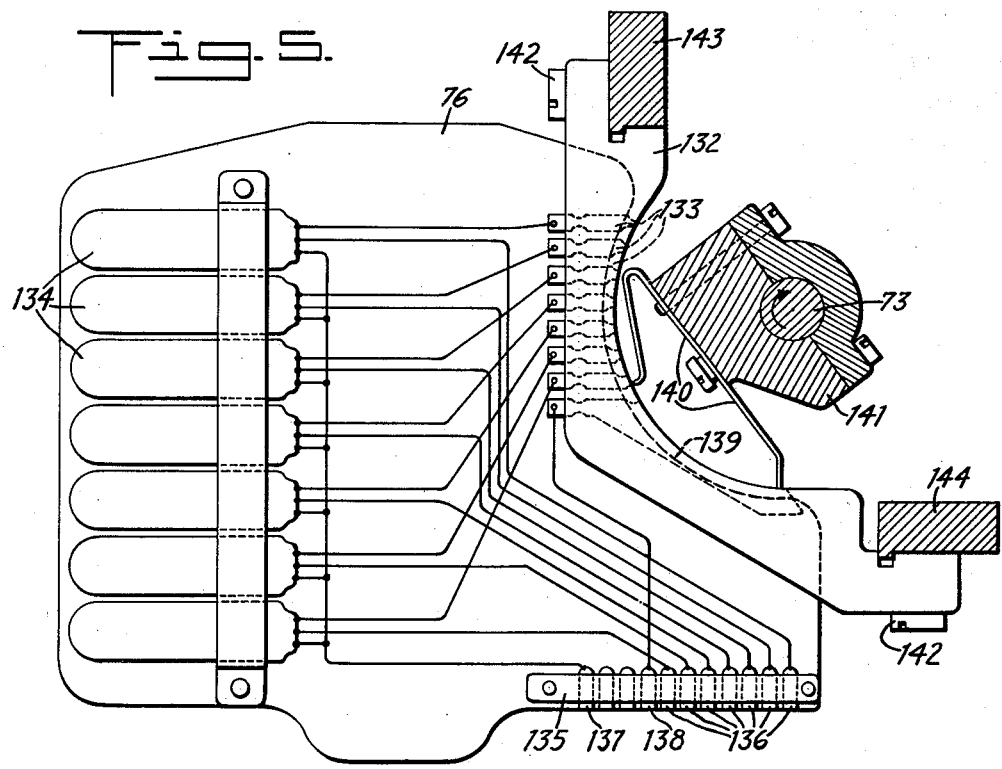
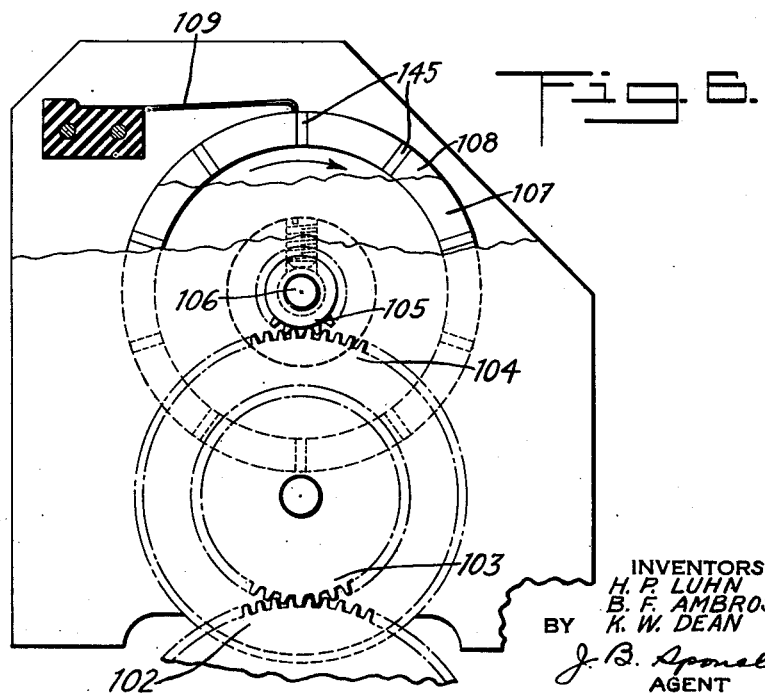
INVENTORS
H. P. LUHN
B. F. AMBROSIO
K. W. DEAN
BY
AGENT July 8, 1952      H. P. LUHN ET AL      2,602,545
DATA COMPARING APPARATUS
Filed Dec. 30, 1947      11 Sheets-Sheet 5
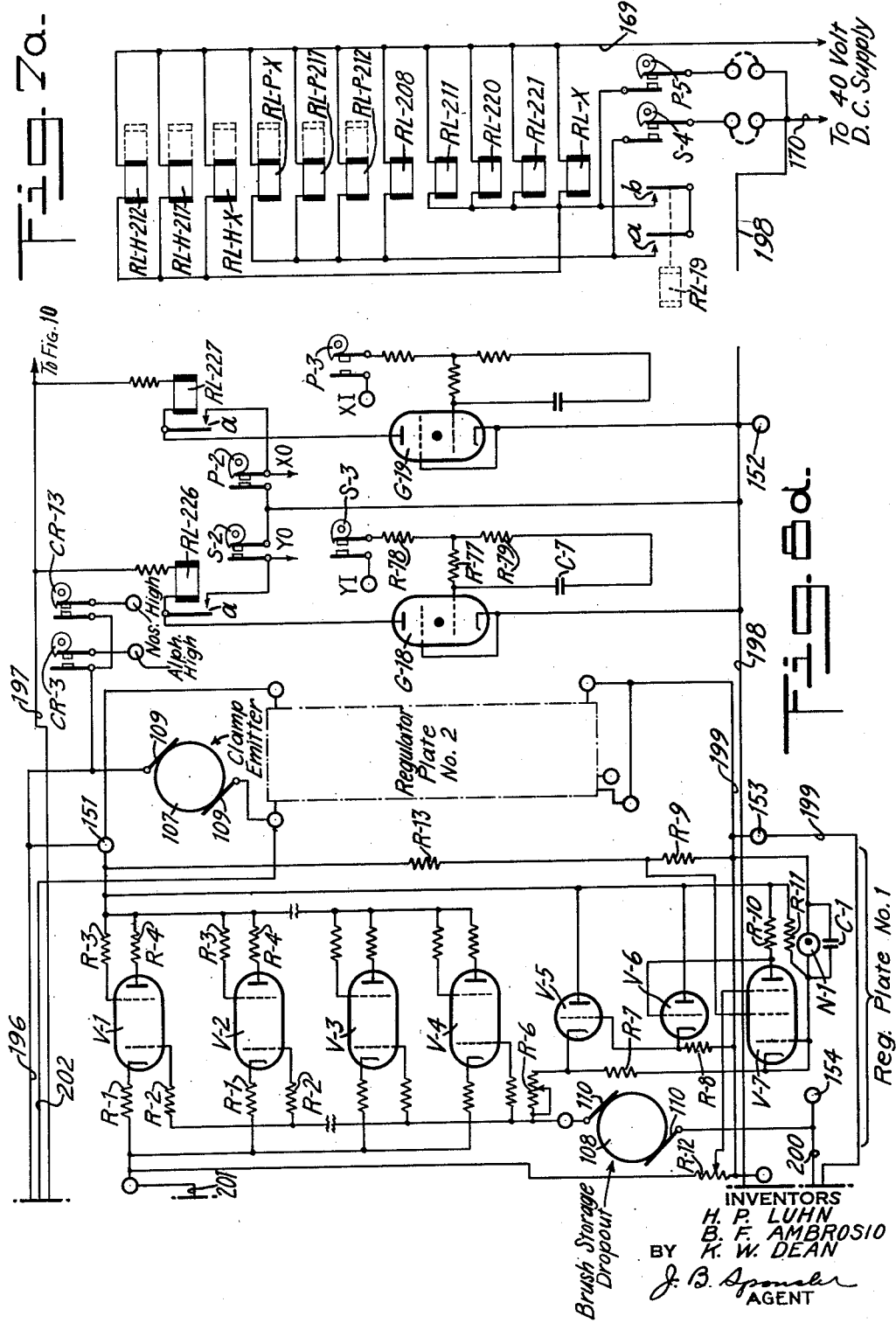
INVENTORS
H. P. LUHN
B. F. AMBROSIO
K. W. DEAN
BY J. B. Sponsler
AGENT

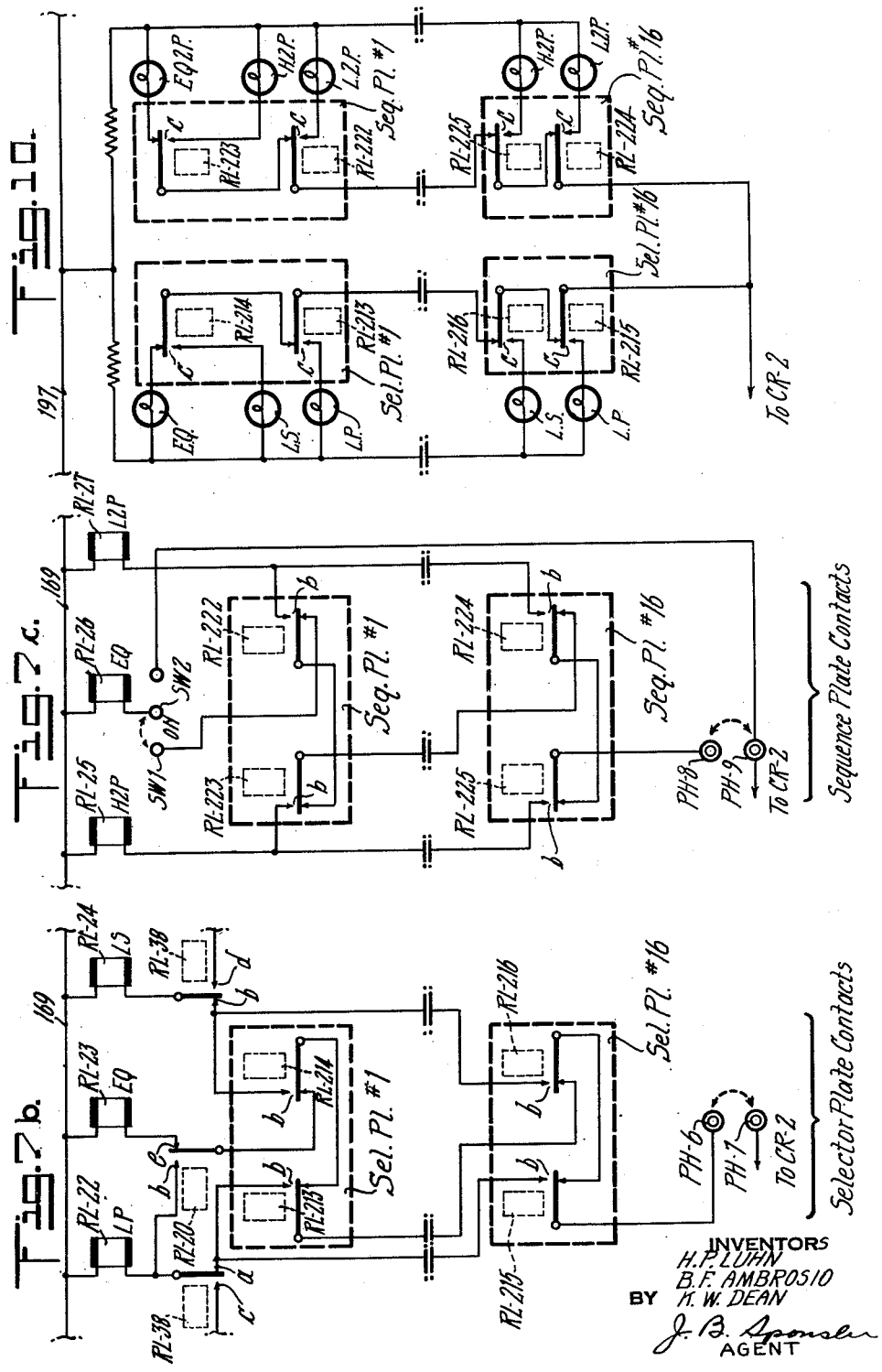

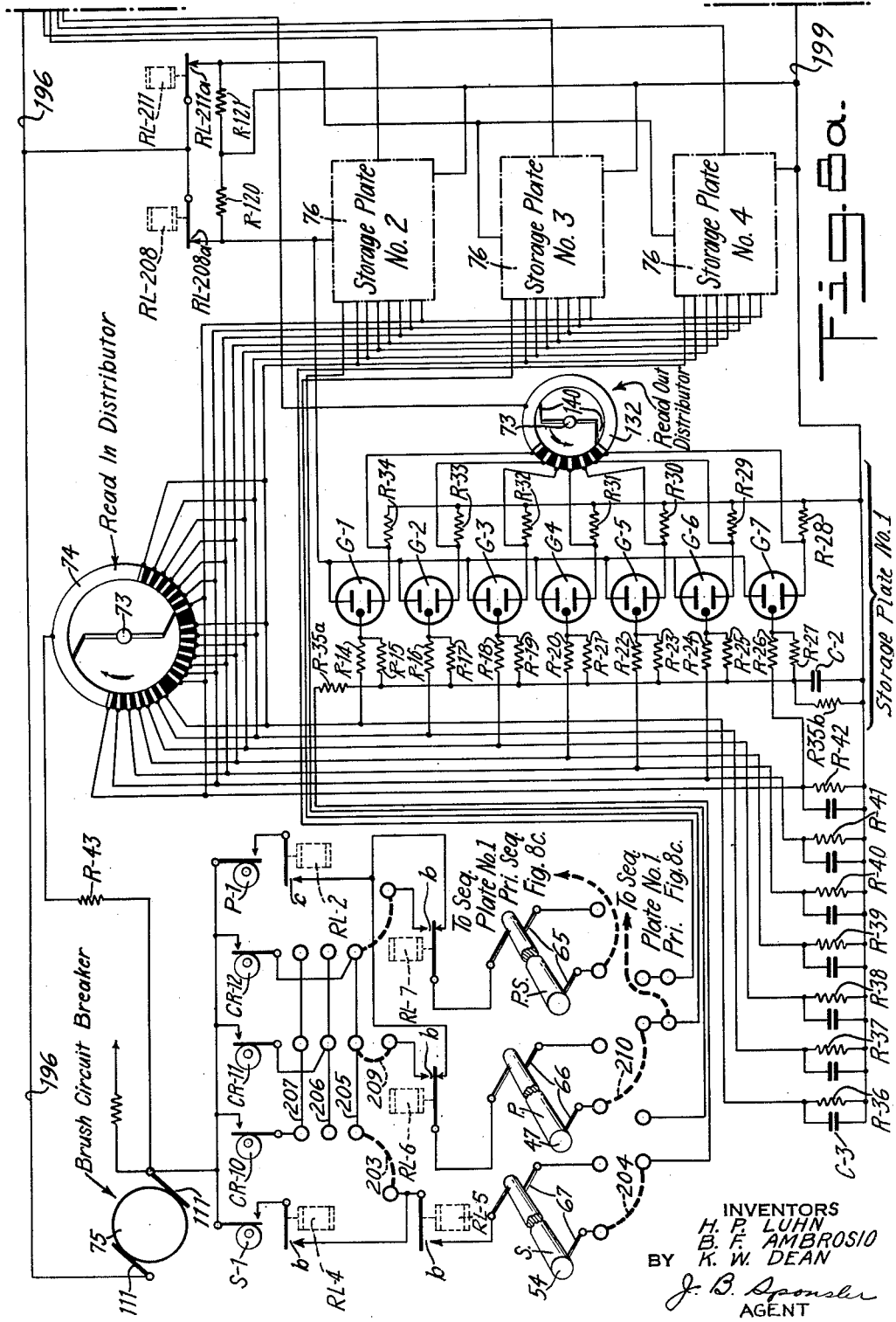

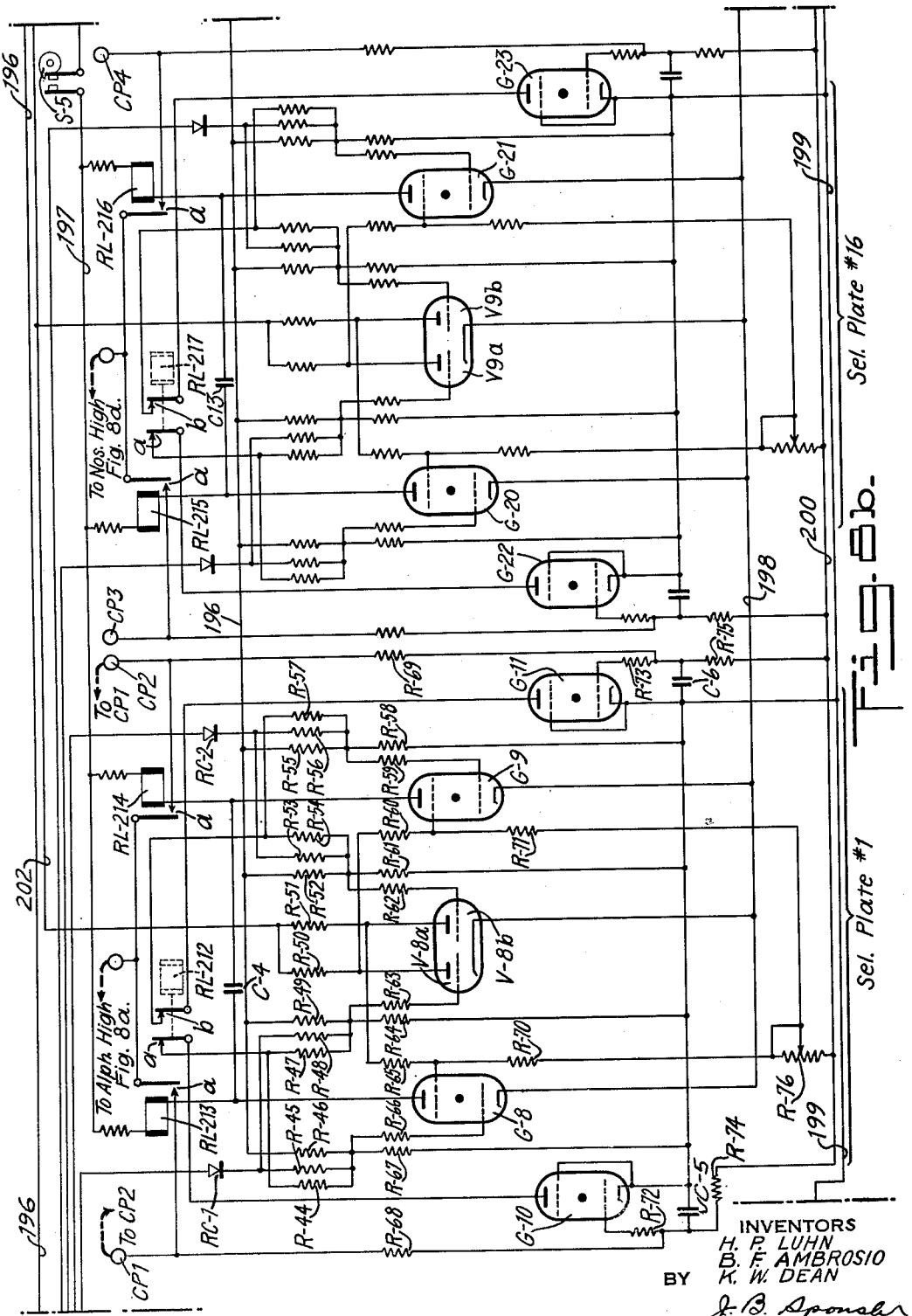

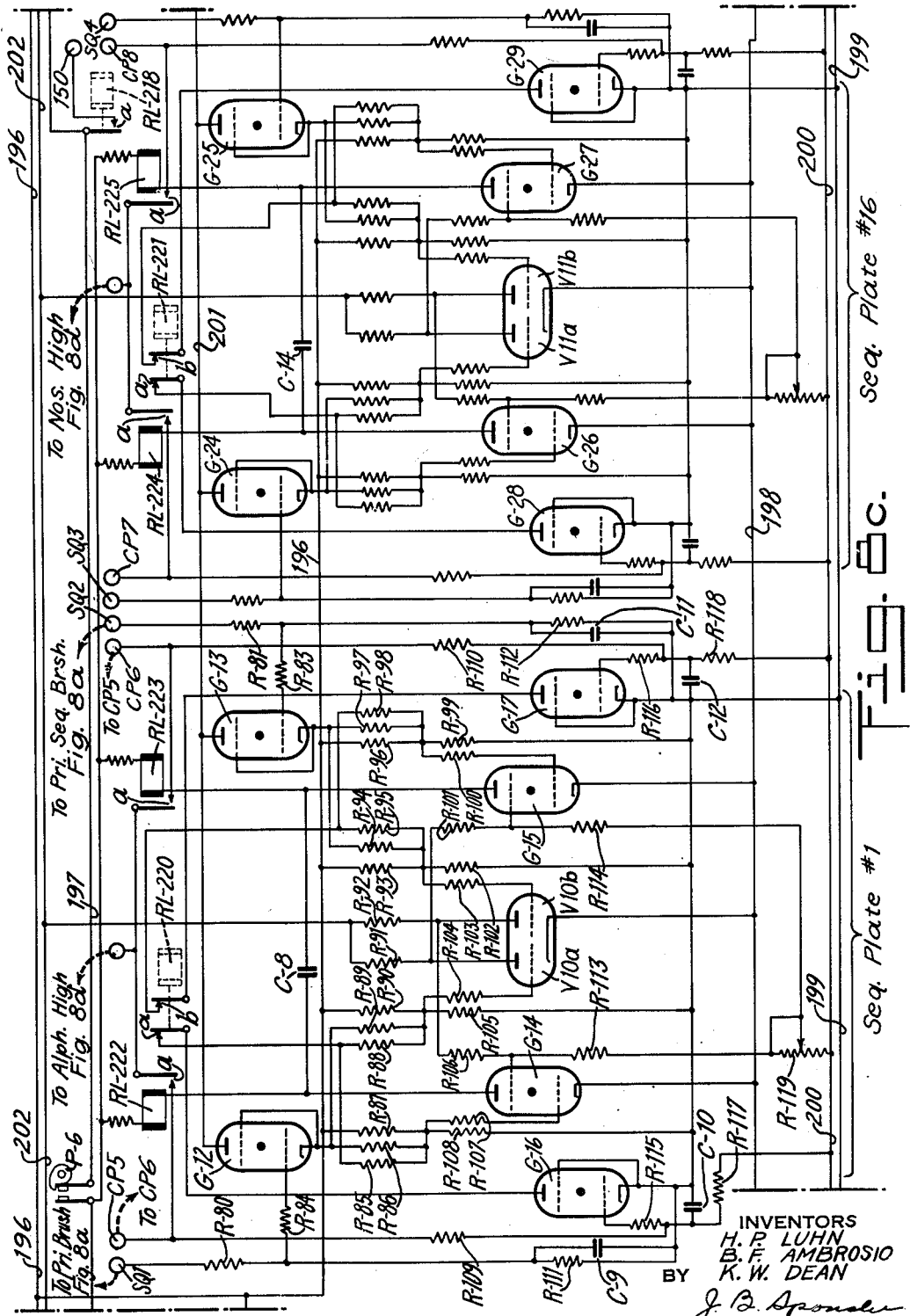

Patented July 8, 1952

2,602,545

UNITED STATES PATENT OFFICE 2,602,545

DATA COMPARING APPARATUS

Hans P. Luhn, Armonk, Biagio F. Ambrosio, Long Island City, and Kenneth W. Dean, Poughkeepsie, N. Y., assignors to International Business Machines Corporation, New York, N. Y., a corporation of New York Application December 30, 1947, Serial No. 794,530

6 Claims. (Cl. 209—110)

This invention is related to improvements in classifying and selecting mechanism pertaining to certain record controlled machines, sometimes referred to as collating machines, and is particularly concerned with a collating machine, of the type described in U. S. Patent 2,379,828, wherein the present invention has been embodied.

Briefly the present invention includes novel improvements in sensing record card data by means of cold cathode gaseous discharge devices wherein the data is stored and from which the data is withdrawn for comparison so that data sensed at one time in a card cycle can be compared with other data sensed at a later time in the card cycle. The comparing means is provided by a combination of gaseous discharge devices and electron tubes wherein the latter operate under certain conditions to prevent operation of the former. The comparing means also includes certain additional gaseous discharge devices whereby the data received for comparison may be selectively disregarded to effect a reversal in the natural order of sequence of the data. Certain additional mechanical features are provided for operating with the machine described in the above named reference patent in order to assist in the control of the various electronics devices just described.

One of the main objects of this invention resides in the provision of novel comparing and selecting circuits involving space discharge devices whereby the speed of operation of collating apparatus may be increased at no sacrifice in machine accuracy.

Another object of the present invention is to provide novel means in collating machine circuits whereby the sequence response in a collating operation may be interchanged between two groups of characters having different established orders of sequence.

Still a further object of the invention lies in the provision of storage means comprising gaseous space discharge devices wherein data is stored and thereafter selected for comparison in collating operations.

Other objects of the invention will be pointed out in the following description and claims illustrated in the acompanying drawings, which disclose, by way of example, the principle of the invention and the best mode, which has been contemplated, of applying that principle.

In the drawings:

Fig. 1 is a partial diagrammatic view of the principal mechanical features of the reference patent (U. S. 2,379,828).

Fig. 2 is a further diagrammatic view of Fig. 1 together with certain additional elements residing in the present invention.

Fig. 3 and Fig. 3a illustrate respectively a novel control element and its data arrangement, respectively, as applied to the present invention.

Fig. 4 illustrates the mechanical arrangement of the additional elements shown in Fig. 2 as applied to a collating machine of the type disclosed in the reference patent.

Fig. 5 is a partial sectional view of one of the additional elements first shown in Fig. 2 and taken along a line 5—5 of Fig. 4.

Fig. 6 is a partial sectional view of another of the additional elements first shown in Fig. 2 and further illustrated in Fig. 4.

Figs. 7a, 7b, and 7c show fragmentary circuit diagrams pertinent to the present invention applied to the circuit of the machine described in the reference patent.

Figs. 8a, 8b, 8c, and 8d are circuit diagrams of the electronics devices of the present invention applied to the machine described in the reference patent.

Figure 9A:
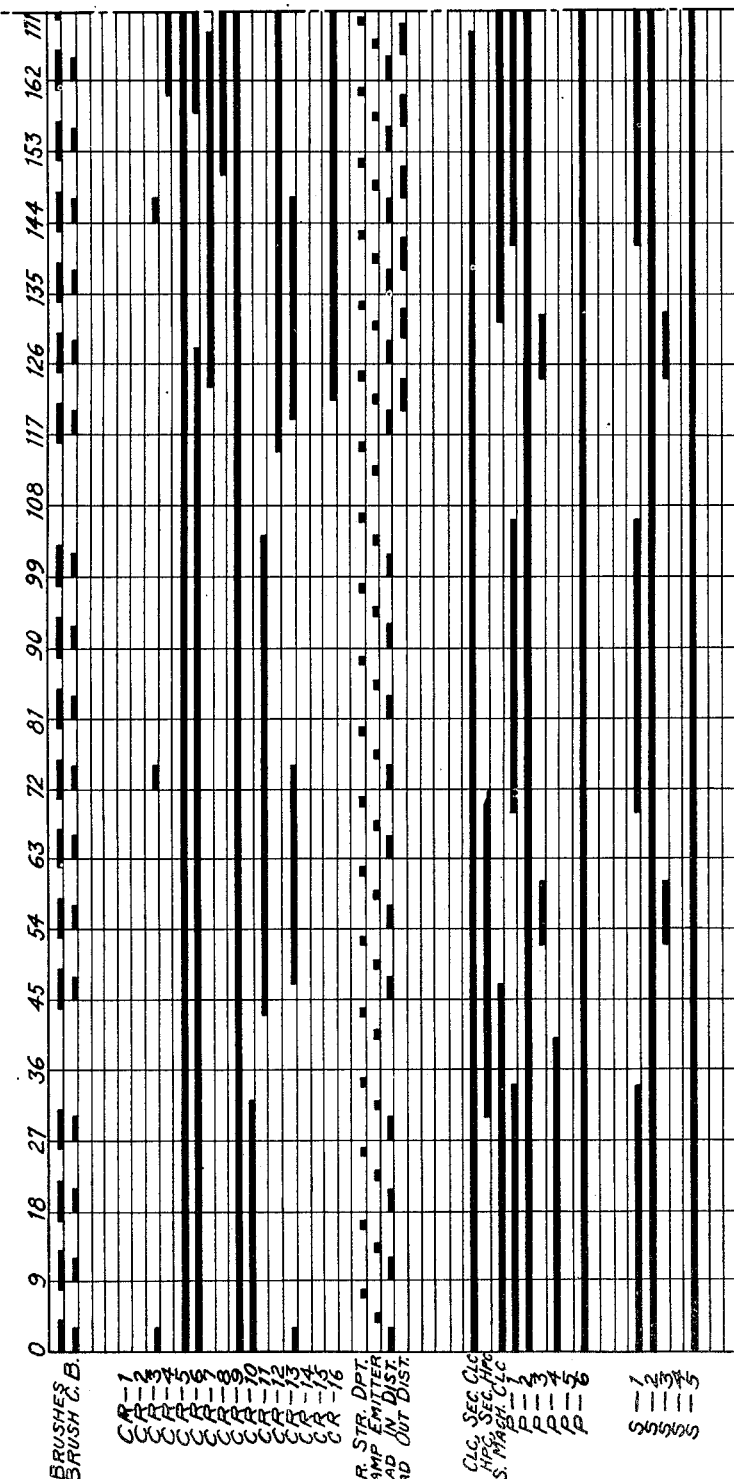
Figure 9B:
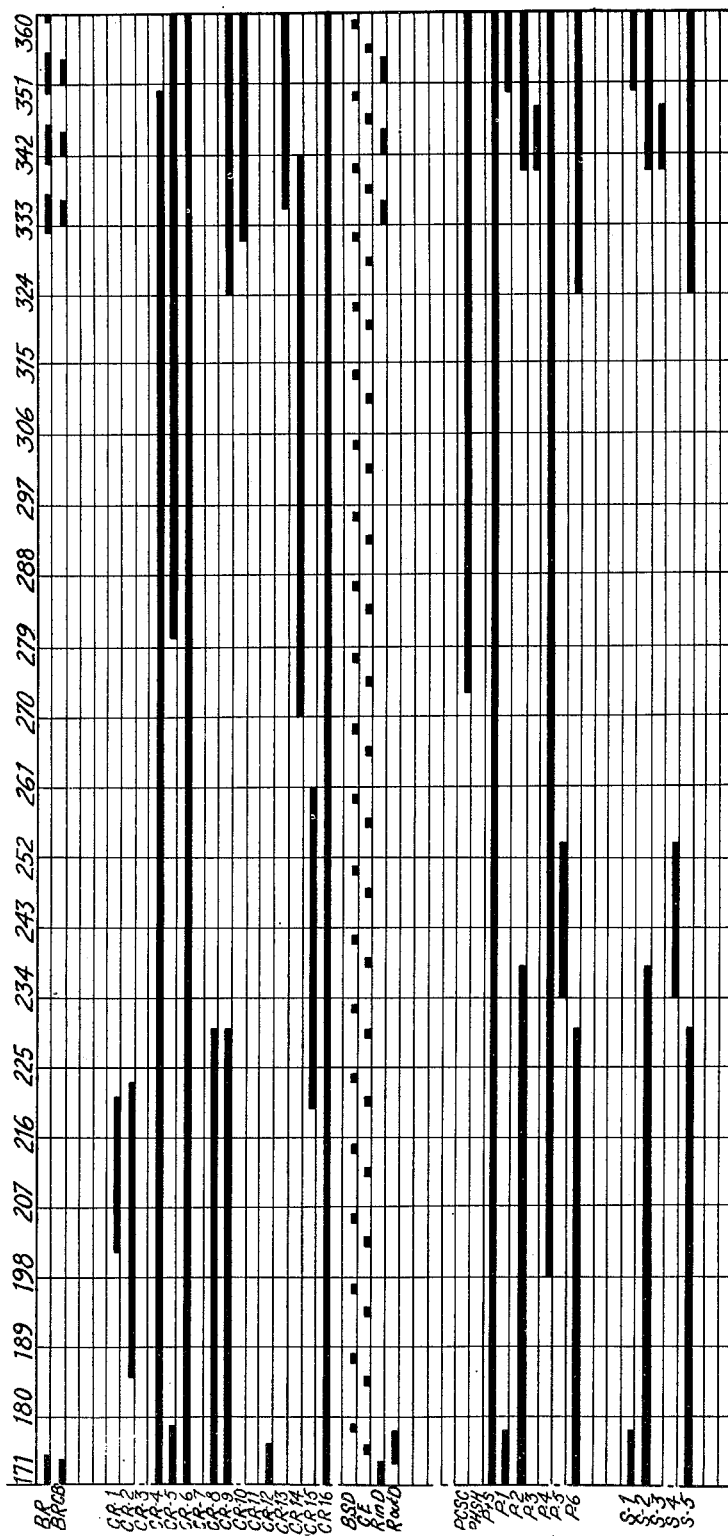

Figs. 9a and 9b, together, illustrate the timing of various electrical components of the present invention and their relations with respect to the timing of other electrical components of the reference patent.

Fig. 10 illustrates the circuit of an indicating device shown in Fig. 4 and operating in conjunction with the circuits of Figs. 7b and 7c.

Throughout the description and discussion which follows frequent reference is made to the figures in the drawings of U. S. Patent 2,379,828 in order to prevent needless repetition of matter old in the art and to reduce the amount of detail otherwise necessary. Certain prefixes to the reference characters in the drawings of the present invention are purposely differentiated from those of the reference patent; for example, all relays are designated by an "RL" prefix. These and others of a similar nature will be clarified as they are encountered in the following description.

The control element shown in Fig. 3 is a record card of size and shape similar to the well known Hollerith tabulating card; however, the arrangement of data representations provides for 60 columns of data in each of three decks or sections shown as "Deck A," "Deck B," and "Deck C" so that a total of 180 characters may be represented in a single record card. The features of the control element or record card are more fully disclosed in a copending application, Serial No. 768,640, dated August 14, 1947 of H. S. Beattie, G. F. Daly, H. P. Luhn, and R. E. Page. With this type of record card each section of each column is provided with seven index point positions, corresponding to the numerical values 0, 1, 3, and 5 and to the designations X, Y, and Z, wherein single or combinational perforations, or similar indicia, represent the numerical values zero through eleven, ten special symbols, and the alphabetical letters "A" through "Z" arranged to have ascending sequence in the order named, as illustrated by Fig. 3a. A blank column section, i. e. one having no perforations, is lower in sequence than any character named above. For example, a group of cards collated properly in the above arrangement of sequence would read:

| Blank | 22345B |
| 123456 | A2345B |
| 123457 | ABC45B |
| 223457 | ABC45C |
| 22345(Sp1) | XYZ45Z |
| 22345(Sp9) | ZZZZZZ |

The mechanical functioning of the machine disclosed in the reference patent, to which the present invention has been applied, is briefly illustrated in Fig. 1. Record cards of the type previously referred to are placed in the machine, primary cards P being placed in a hopper 31 and secondary cards S in a hopper 32. Card feed knives 33 are provided in each of the hoppers for feeding the cards one at a time from the bottom of each stack.

The feed knives 33 have rack teeth 34 meshed with segments 35 which are oscillated by cams 36 fixed to gears 37 and 38, respectively. The gear 37 is driven through an idler gear 39 by a gear 40 attached to a shaft 41 (see also Fig. 2). The gear 38 is driven by a gear 42 on a shaft 43. The shaft 41 and two other shafts 44 carry feed rolls 45. These shafts 41 and 44, together with two other shafts 46 carrying contact rolls 47, are driven by a primary drive shaft 48 (see Fig. 2) through similar pairs of spiral gears 49 and 50. The shaft 43 and another shaft 51 carry feed rolls 52, and are driven, together with a shaft 53 carrying a contact roll 54 by a secondary drive shaft 55 via pairs of spiral gears 56 and 57. Referring also to Fig. 2, the shaft 55 may be connected to rotate with a continuously rotating shaft 58 by a one-revolution clutch 59 through the action of a clutch magnet 60 (see reference patent Fig. 1c, SFM). In a similar manner the shaft 48 may be connected to rotate with a continuously rotating gear 61, which meshes with another gear 62 attached to the shaft 58, by a one revolution clutch 63 through the action of a clutch magnet 64 (see reference patent Fig. 1c, PFM). A contact roll 47 coacting with sensing brushes 65 forms what is known as a sequence sensing station (see P. S. Fig. 8a) while the contact roll 47 coacting with sensing brushes 66 forms what is known as a primary sensing station (see P. Fig. 8a). Similarly the contact roll 54 and brushes 67 form a secondary sensing station (see S. Fig. 8a), each of the said stations being capable of sensing perforations indicative of record card data.

Fixed to the shaft 58 (see also Fig. 4) is a gear 68 which meshes with another gear 69 fixed to a shaft 70 provided also with a gear 71 coacting with a gear 72 connected to another shaft 73. The shaft 73 carries a rotary arm (not shown) making contact with a conventional type distributor 74 (see also Fig. 8a), a circuit breaker 75, and a plurality of rotors 141 (see Fig. 5) coacting with an equal number of impulse storage plates 76 (illustrated in detail in Fig. 5) later described herein.

Cards are fed from the hoppers 31 and 32 in the directions indicated by the arrows of Fig. 1. With the primary drive shaft 48 rotating the feed knife 33 associated with hopper 31 feeds a card from the hopper 31 coacting with the feed rollers 45 to a pair of eject rolls 77 and 78. With the secondary drive shaft 55 rotating the feed knife 33 associated with hopper 32 feeds a card from the hopper 32 coacting with the feed rollers 52 to a pair of eject rolls 79 and 80. The eject rolls 79 and 80 are driven by the shaft 53 through the gear train comprising gears 81, 82, 83 and 84, the gear 81 being fastened to shaft 53 and gear 84 being attached to a shaft 85 which carries the eject roll 80. The eject rolls 77 and 78 are driven by the continuously running shaft 58 through a one-revolution clutch 86 becoming effective via action of an eject magnet 87 (see reference patent Fig. 1c, EM), the driving element of the clutch being geared to the shaft 58 by a pair of spiral gears 88 and 89, a shaft 90, a pair of gears 91 and 92, and a shaft 93 to which the driving element is fixed, while the driven element of the clutch is fixed to a shaft 94 carrying a gear 95 meshing with another gear 96 connected to a shaft 97 which carries the eject roll 77. The shaft 99 carries a feed roll 98, and three similarly driven shafts 99 each carry a feed roll 100, all these feed rolls coacting with other feed rolls 101 on companion shafts to feed cards from the eject rolls to selected card pockets designated A, B, C, and D.

The continuously running shaft 58 also carries a gear 102 which meshes with another gear 103 attached to a common shaft with a gear 104 which drives a gear 105 fastened to a shaft 106 carrying two rotors 107 and 108, each having brushes 109 and 110, respectively, for making contact therewith (see also Fig. 4). The rotor 75 and brushes 111 bearing upon its periphery represent a conventional circuit interrupter, referred to hereinafter as the Brush Circuit Breaker, for providing timed pulses in accordance with the timing chart shown in Figs. 9a and 9b. The distributor 74, hereinafter referred to as the Read in Distributor, delivers impulses of the same time and duration as the Brush Circuit Breaker, successively to each of a plurality of circuit elements as shown in Fig. 8a, its timing being shown in Figs. 9a and 9b.

Cards are fed into the pockets A, B, C, and D under the guidance of blades 112, 113, and 114. The rear end of the blade 114 is held upon the tip of a lever 115 continually urged upwards (see Fig. 1) by a spring 116; however, the lever 115 is normally retained by a latch 117 forming an armature for a selector magnet 118, the latch being pivoted at 119. When the magnet 118 (see reference patent Fig. 1d, PRM) is not energized the blade 114 guides cards ejected from the eject rolls 77 and 78 to be fed into pocket B; however, when the magnet 118 is energized the latch 117 releases the lever 115 and the end of blade 114 is moved upwards by the action of the spring 116 so that cards are fed from the eject rolls 77 and 78 under the blade 114 into pocket A. The rear ends of the blades 112 and 113 are spaced apart transversely. The rear end of the blade 113 extends under the tip of a lever 120 continually urged downwards by a spring 121 but normally retained by a latch 122 forming an armature for a selector magnet 123 (see reference patent Fig. 1d, SRM1), while the rear end of the blade 113 extends under a similar lever (not shown) associated with similar mechanism (not shown) under the control of a similar magnet (see reference patent, Fig. 1d, SRM2). When both of the last mentioned selector magnets are deenergized, cards are fed from eject rolls 79 and 80 under blade 113 into pocket B. When selector magnet 123 is energized, the blade 113 is depressed at its rear end to permit cards to be fed from the eject rolls 79 and 80 over blade 113 (between blades 112 and 113) into pocket C. When the other selector magnet is energized both the blades 112 and 113 are depressed at their ends, in a similar manner, so that cards are fed from the eject rolls 79 and 80 over the blade 112 into pocket D.

It is therefore obvious that primary cards P are fed as a result of energizing of the primary feed magnet 64 (or magnet PFM of the reference patent) and may be directed into either pocket A or pocket B depending upon the energization of selector magnet 118 (or magnet PRM of the reference patent). Likewise secondary cards S are fed as a result of energizing of the secondary feed magnet 60 (or magnet SFM of the reference patent) and may be directed into the pockets B, C, or D upon energization of the selector magnets 123 and a similar magnet not shown (corresponding to the magnets SRM1 and SRM2 of the reference patent). No primary cards P are fed into the pockets A or B, however, unless the eject magnet 87 (corresponding to magnet EM of the reference patent) is also energized. The feed magnets, selector magnets, and the eject magnet are energized in accordance with certain circuits set up and energized principally by certain relays (namely, relays R-22, R-23, R-24, R-25, R-26, and R-27 of the reference patent) the operation of which is covered in detail in pages 17 to 53 of the said reference patent. The above mentioned relays are shown in Figs. 7b and 7c of the drawings herein, and are described in that connection later herein.

The impulse storage plate 76 is illustrated in detail in Fig. 5, and actually consists of a contact ring 132 having a plurality of contact inserts 133 to each of which is connected the cathode terminal of a gas triode 134, there being a plurality of such triodes incorporated into the storage plate 76. A terminal block 135 is also included in the plate 76 having socket type terminals 136 each connected to a control element of one of the gas triodes 134, a socket type terminal 137 connected in common to all the anodes of the gas triodes 134, and a socket type terminal 138 connected to an elongated insert 139 in the contact ring 132. Capacitors and resistors (Fig. 8a) are also provided in the storage plate to form the required circuit components.

The plate 76 is arranged so that the ring 132 provides a surface upon which rides a brush 140 mounted on a rotor 141 attached to rotate with the shaft 73 (see Figs. 2 and 4). As the brush 140 rotates the insert 139 is successively connected with each of the inserts 133. The contact ring 132, together with the brush 140 is hereinafter referred to as a Read Out Distributor (see also Fig. 8a). The plate 76 is provided with mounting bolts 142 for mounting the plate to the collating machine frame members 143 and 144. Wiring from the machine proper is brought to the plates 76 by cables terminating in plugs (not shown) which are inserted into the socket terminals 136, 137, and 138 in the block 135. By this arrangement the impulse storage plates 76 may be readily interchanged one for another in the event of electrical or mechanical failure. Normally thirty-two plates 76 and six spare plates 76s (see Fig. 4) are provided for a machine such as that described in the reference patent. A rotor 141 having a brush 140 is provided for each plate 76, all of the rotors 141 being fixed similarly to the shaft 73.

As shown in Fig. 6 the rotor 107 is provided with a plurality of conductive inserts 145 which contact a pair of brushes 109 as the shaft 106 rotates to provide periodic impulses for a circuit connected through the pair of brushes 109. The rotor 107 and the brushes 109 are hereinafter referred to as the Clamp Emitter (see Fig. 8d). The rotor 108 and the brushes 110 operate similarly to provide periodic impulses and are hereinafter referred to as the Brush Storage Dropout (see Fig. 8d). Since both the Clamp Emitter and the Brush Storage Dropout are used for furnishing impulses of very short duration to electronics devices, additional gearing is provided by the gear train comprising gears 102, 103, 104, and 105 which drive the shaft 106 at high speed, the gear 102 being driven by shaft 58 (see Fig. 2).

In the present invention certain cams are provided on the shafts 48, 55, and 58 for operating contacts to interrupt electrical circuits, in addition to those circuit breakers previously mentioned. The cams are shown in Fig. 4 as CR-Cams which rotate continuously with the shaft 58, P-Cams which rotate with shaft 48 when primary cards P are fed, and S-Cams which rotate with shaft 55 when secondary cards S are fed. There are spare cams carried on each of the above mentioned shafts. All of the cams are provided with contacts similar to those in the reference patent, and many of the cam contacts are similar in timing and operation to those shown in the machine described therein. Figs. 9a and 9b, together, form a timing chart which in the present invention supplants the timing chart of Fig. 10a of U. S. Patent 2,379,828. The cam contacts of the present invention are more numerous than those in the reference; however, certain of these are equivalents and will not be discussed in detail herein except by reference to one another as follows:

| Fig. 10a of U. S. Patent 2,379,828 | Figs. 9a and 9b of subject invention |
|---|---|
| PB1, PB2, SB | Brushes. |
| CB1, CB2, CB3, CB4 | Brush C.B. |
| PCL1, PCL2, SCL1 | PR1. CLC, Sec. CLC. |
| PHC, SHC | PR1. HPC. Sec. HPC. |
| PCL, SCL | P. and S. Mach. CLC. |
| CR-1 | CR-1. |
| CR-2 | CR-2. |
| CR-3 | CR-9. |
| CR-4 | CR-4. |
| CR-5 | CR-5. |
| CR-6 | CR-6. |
| CR-7 | CR-7. |
| CR-8 | CR-8. |
| CR-9 | CR-14. |
| CR-10 | CR-15. |
| CR-11 | CR-16. |
| PC-1 | P-1. |
| PC-2 | P-2. |
| PC-3 | P-3. |
| PC-4 | P-4. |
| SC-1 | S-1. |
| SC-2 | S-2. |
| SC-3 | S-3. |

Most of the cam contacts and other circuit interrupters added in the present invention (see Figs. 9a and 9b) are concerned with the operation of electronics devices. Briefly the functions of these circuit devices may be described as follows:

(1) Read in Distributor—provides a selective pulse to partially excite the control elements of the gaseous discharge devices G–1 to G–7 in conjunction with the Brush Circuit Breaker which supplies a complementary pulse via the contact rolls and sensing brushes to ignite the gaseous discharge devices when card data is sensed (see Fig. 8a).

(2) Read Out Distributor—provides voltage pulses to Selector Plates in accordance with conductive gaseous discharge devices G–1 to G–7 in which card data is stored after being sensed (see Fig. 8a and Fig. 8b).

(3) Clamp Emitter—provides high voltage pulses of very short duration (by shorting Regulator Plate No. 2 output), to screen grids of thyratrons G–8, G–9, G–14, G–15, G–20, G–21, G–26, G–27, and similar thyratrons in selector and sequence plates to permit them to become conductive when their control grids are appropriately energized (see Fig. 8d, and Figs. 8b and 8c).

(4) Brush Storage Dropout—interrupts anode circuits of thyratrons G–12, G–13, G–24, G–25, and similar thyratrons in other sequence plates, by bringing output voltage of Regulator Plate No. 1 to zero (introducing negative potential to control grids of V–1, V–2, V–3, V–4) to drop out the above mentioned thryratrons which become conductive each cycle point (see Fig. 8d and Fig. 8c).

(5) CR–3—provides positive impulses to control grids of thyratrons G–10, G–11, G–16, G–17, G–22, G–23, G–28, G–29 and similar thyratrons in selector and sequence plates to pick up the thyratrons under Alph. High comparison (see Fig. 8d and Figs. 8b and 8c).

(6) CR–10, CR–11, CR–12—select appropriate deck or decks of record cards being sensed according to time in card cycle wherein data is sensed (see Fig. 8a). (Note. CR–9 (in order to be used in an equivalent manner with CR–3 of the reference patent) may be used in series common to CR–10, CR–11, and CR–12; however, since the sensing of data in the present invention merely delivers voltage impulses to electronics devices, resulting in very small currents, CR–9 is not essential and is omitted from the circuit of Fig. 8a).

(7) CR–13—provides positive impulses to control grids of thyratrons G–10, G–11, G–16, G–17, G–22, G–23, G–28, G–29 and similar thyratrons in selector and sequence plates to pick up the thyratrons under Nos. High comparison (see Fig. 8d and Figs. 8b and 8c).

(8) P–5—interrupts anode circuits of storage plate gaseous discharge devices made conductive by sensing primary card data (such as G–1 to G–7 of Storage Plate No. 3 or No. 4) via operation of the relay RL–211 and opening of contacts RL–211a, and interrupts anode circuits of G–16, G–17, G–28, G–29, and similar thyratrons in sequence plates via operation of relays RL–220, RL–221, RL–X and opening of contacts RL–220a, RL–220b, RL–221a, and RL–221b (see Fig. 7a and Figs. 8a and 8c).

(9) P–6—interrupts anode circuits of thyratrons G–14, G–15, G–26, G–27, and similar thyratrons in sequence plates (see Fig. 8c), and also interrupts anode circuits of thyratrons G–8, G–9, G–20, G–21, and similar thyratrons in selector plates when S–5 is made (see Fig. 8b).

(10) S–4—interrupts anode circuits of storage plate gaseous discharge devices made conductive by sensing secondary card data (such as G–1 to G–7 of Storage Plate No. 1 or No. 2) via operation of the relay RL–208 and opening contacts RL–208a, and interrupts anode circuits of G–10, G–11, G–20, G–21, and similar thyratrons in selector plates via operation of relays RL–P–212, RL–P–217, RL–P–X, and opening of contacts RL–212a, RL–212b, RL–217a, RL–217b (see Fig. 7a, and Figs. 8a and 8b).

(11) S–5—interrupts anode circuits of thyratrons G–8, G–9, G–20, G–21, and similar thyratrons in selector plates when P–6 is made (see Fig. 8b and Fig. 8c).

A 40 volt D. C. supply (see 169 and 170 of Fig. 7a) is provided in the subject invention corresponding to that of the reference patent (W1 and W2, Fig. 1a). In addition the present invention requires several additional direct current supplies, these being provided by conventional type rectifiers to give D. C. potentials as follows (see Fig. 8d):

(a) 110 volts between terminals 150 and 152, terminal 150 being positive (see Fig. 10).

(b) 165 volts between terminals 151 and 153, terminal 151 being positive.

(c) 65 volts between terminals 152 and 153, terminal 152 being positive.

(d) 45 volts between terminals 153 and 154, terminal 153 being positive.

Voltages are also supplied for heating the cathodes of the thyratrons and the vacuum tubes, these sources not being shown.

The normal operation of the machine described in the reference, at pages 17 and 18, is identical to that in the present invention. Thereafter the control of the machine in the present invention is provided by comparison devices and associated circuits into which the sensed card data is fed in the form of electrical impulses, the devices and circuits being illustrated principally in Figs. 8a, 8b, 8c, and 8d. The operation of these circuits and devices is directed to the control of the basic setup relays RL–22, RL–23, RL–24, RL–25, RL–26, and RL–27 (shown in the fragmentary circuits of Figs. 7b and 7c which bear obvious resemblance to circuits in Fig. 1d of the reference patent) corresponding to the relays R–22, R–23, R–24, R–25, R–26, and R–27 of U. S. Patent 2,379,828. These relays in turn control the feeding of primary and secondary cards by completing circuits through the primary and secondary feed magnets and the eject magnet referred to previously. In some respects, it may be considered that the present invention is directed to the operation and selective control of the said feed magnets through the said relays as a result of certain combinations of circuits established through the actuation of electronics devices. The electronics devices and their associated circuits and actuating devices are, in turn, operated as a result of the sensing of card data by the brush sensing stations.

The brush sensing stations are shown in Fig. 8a; however, before describing their functioning and operation, certain factors, relating thereto, are to be pointed out. In Fig. 3 is shown a control element in the form of a record card which is particularly adapted to utilization in the present collating machine. The said card is provided with three sections or decks into which data may be placed, for example, by means of perforations. Comparison may be effected between inter-deck data as well as between intra-deck data of two cards (i. e. a primary card and a secondary card), and means is provided in the form of plug hubs to select decks with respect to the brush sensing stations. For example, the "C" deck of a primary card may be compared with the "A" deck of a secondary card by suitable plugging. This feature is made feasible by virtue of the storage plates 76, previously referred to, in that data is sensed from the different decks "A," "B," and "C" at different times, which are controlled by the circuit breakers CR-10, CR-11, and CR-12 (see Figs. 9a and 9b for timing) shown in Fig. 8a, and stored in storage plates 76, from which the data is read out into the electronic comparing devices, the read out for primary and secondary card data being made simultaneously near the end of each card cycle (see Figs. 9a and 9b—Read Out Distributor).

With respect to Figs. 8a, 8b, 8c, and 8d, certain lines are designated by reference to the potential and polarity of the D. C. supplies previously discussed. Thus line 196 is positive 165 volts, terminating in post 151, line 197 is positive 110 volts terminating in post 150 (the negative side corresponding to the 110 volt line is line 198), line 198 is positive 65 volts and terminates in post 152, line 199 is at zero potential with respect to lines 196 and 198 and terminates in post 153, line 200 is negative 45 volts with respect to line 199 and terminates in post 154 (corresponding to a similarly numbered post in Fig. 7a), and line 169 is positive 40 volts (the negative side corresponding to line 170).

The line 201 is supplied with positive 100 volts (D. C.) via a voltage regulator (shown as Regulator Plate No. 1 in Fig. 8d) comprised of the vacuum tubes V-1, V-2, V-3, V-4, V-5, V-6, V-7, the gas tube N-1, the condenser C-1, and the resistors R-1 to R-13, inclusive. A cirucit breaker represented by the rotor 108 and the brushes 110, previously described and known as the Brush Storage Dropout, applies a negative potential to the grids of the vacuum tubes V1, V2, V3, and V4 periodically to correspondingly reduce the potential of line 201 to zero (see Figs. 8c, 8d, 9a, and 9b). A similar voltage regulator (Fig. 8d), Regulator Plate No. 2, delivers positive 100 volts (D. C.) to line 202; however, the rotor 107 and the brushes 109, previously described and known as the Clamp Emitter, periodically applies positive 165 volts (D. C.) from line 196 to the line 202, in effect thereby shortcircuiting momentarily the Regulator Plate No. 2. The direct current input to both regulators just described is supplied by the lines 196 (positive 165 volts) and 199 (zero volts with respect to line 196).

Until the second card feed cycle, the primary sequence brushes 65 (Fig. 8a) and the secondary brushes 67 are isolated from the line 196 (165 volt positive D. C. potential) by contacts RL-7b and RL-5b, respectively. Similarly, the primary brushes 66 are isolated by the contacts RL-6b until the third feed cycle. The contacts RL-5b, RL-6b and RL-7b are all actuated as a result of the closing of card lever contacts SCL1, PCL1, and PCL2 (see Fig. 1a of reference patent). (Note: Relays prefixed "RL-" correspond to similarly numbered relays in the reference patent prefixed "R-.")

Data sensed from a record card by the secondary brushes 67 is fed into a storage plate 76 (see details in Fig. 5) in the form of positive impulses.

With reference to Fig. 8a, the Storage Plate No. 1 is comprised of the cold cathode gaseous triodes G-1, G-2, G-3, G-4, G-5, G-6, and G-7, the resistors R-14 to R-34 and R-35a and R-35b, inclusive, the condenser C-2, and the Read Out Distributor. Storage Plates Nos. 2, 3, and 4 are identical with Storage Plate No. 1.

Normally the shaft 73 rotates continuously so that the Read in Distributor selectively and successively applies a potential to a group of seven resistors; namely, R-36 to R-42, inclusive, each of these resistors having a capacitor C-3 shunted across it. The said potential is applied via line 196, through Brush Circuit Breaker, resistor R-43, Read in Distributor, successively through resistors R-36 to R-42, inclusive, to line 199. This potential is also successively applied to the starter anodes of the triodes G-1 to G-7, inclusive through resistors R-14, R-16, R-18, R-20, R-22, R-24, and R-26, the magnitude of the potential being sufficient to prime, but not to render conductive, the said triodes. Since the Read in Distributor has three similar sections, which are swept over each card cycle, connected in parallel to the resistors R-36 to R-42, inclusive, each gas triode is primed three times per card cycle.

As a record card is fed under the brushes 67 (with the plug wires 203 and 204 connected as shown in Fig. 8a) an additional positive potential is delivered to the starter anodes of the gas triodes G-1 to G-7 whenever a perforation occurs in the card by the following circuit path: line 196, Brush Circuit Breaker, Cr-12 contacts, plug wire 203, RL-5b contacts, contact roll 54, brush 67, plug wire 204, resistor R-35a to each of the resistors R-15, R-17, R-19, R-21, R-23, R-25, R-27 via resistor R-35b to line 199. Since the card is fed past the brushes 67 in timed relation with the sweep of the Read in Distributor, when a perforation occurs in the card the said additional positive potential will combine with the priming potential to render a corresponding gas triode (G-1, . . . G-7) conductive, provided, however, that the perforation occurs in the deck of the card corresponding to the circuit breaker make time of CR-12. With reference to Fig. 3 and to Figs. 9a and 9b, it will be understood that if a record card similar to that shown in Fig. 3 is fed with the "C" deck leading, CR-10 contacts will permit the above circuit to be completed when a perforation occurs in "C" deck of the card, CR-11 when a perforation is in "B" deck, and CR-12 when a perforation is in "A" deck, hence the plug wire 203 being plugged to the line 205 will permit perforations to be read in "A" deck, line 206 in "B" deck, and line 207 in "C" deck.

By way of example, were the record card of Fig. 3 to be fed from the secondary feed under the brushes 67, of which one brush was plugged via plug wire 204 (Fig. 8a) corresponding to column 41 of the record card (perforated in "A" deck at the "Y," "0," and "3" index point positions) with CR-12 only connected (via line 205 and plugwire 203), the gas triodes G-2, G-4, and G-6 would be rendered conductive.

Any of the gas triodes, G-1 to G-7, inclusive, which becomes rendered conductive will be retained in that condition via a circuit from line 196, RL-208a contacts, anode of gas triode (G-1 . . . G-7), cathode of gas triode (G-1 . . . G-7), one of the resistors R-28 to R-34, inclusive, to line 199 (Fig. 8a). The only means by which the last mentioned circuit can be broken, thereby rendering the gas triodes (G-1 . . . G-7) non-conductive, resides in the opening of RL-208a contacts. The relay RL-208 (see Fig. 7a) is energized at the beginning of a secondary feed cycle, provided the RL-19a and RL-19b (see Fig. 7a) contacts are open, via S4 contacts, or at the beginning of a primary feed cycle, provided the RL-19a and RL-19b contacts are closed, via P5 contacts. Relay RL-19 corresponds to relay R-19 of the reference patent. In reference to Figs. 8a, 9a, and 9b, it is obvious that any voltage drops across the resistors R-29 to R-34 (as a result of the gas triodes being conductive) will be picked off by the brushes 140 of the Read Out Distributor beginning at 120 degrees of each machine cycle, i. e. regardless of whether or not there is a primary or secondary feed of the record cards. The voltage drops, just described, existing in Storage Plate No. 1 will be supplied to Selector Plate No. 1 (Fig. 8b) in a manner hereinafter described.

Similarly, data sensed from a record card by the primary brushes 66 will be stored in Storage Plate No. 3, provided the plug wires 209 and 210 are connected as shown in Fig. 8a and the Read Out Distributor associated with Storage Plate No. 3, will supply voltage drops to Selector Plate No. 1. It is to be noted that the RL-211a contacts serve to deionize the gas triodes in Storage Plate No. 3 in a manner similar to the RL-208a contacts for Storage Plate No. 1. The relay RL-211 is shown in Fig. 7a and is controlled via P-5 contacts when RL-19a and RL-19b contacts are open, or by S4 when RL-19a and RL-19b contacts are open, or by S4 when RL-19a and RL-19b are open. It will be noted that Storage Plate No. 1 and Storage Plate No. 2 are arranged similarly for control by RL-208a contacts and that Storage Plate No. 3 and Storage Plate No. 4 are arranged to be controlled by RL-211a contacts; in other words, two storage plates are provided for secondary card data and two storage plates are provided for primary card data. As previously explained, in the present collating machine there are actually sixteen primary storage plates and sixteen secondary storage plates plus six space plates provided. The number of such plates is determined by the number of card column positions which may be desired to be compared at one time, each column compared requiring one primary and one secondary storage plate.

The present invention, in addition to the storage plates, includes sixteen selector plates, each of which functions, under the control of electronics devices contained therein, to compare the data of two storage plates, which normally contain data representative of a primary and a secondary card respectively.

Fig. 8b diagrammatically illustrates the selector plates, which physically resemble the storage plates 76 except that no moving parts or read out mechanism is required. Selector Plate No. 1, typical of all the selector plates, consists of dual vacuum tubes V-8a and V-8b, four thyratrons G-8, G-9, G-10, and G-11, three capacitors C-4, C-5, and C-6, two uni-directional crystal rectifiers RC-1 and RC-2, two relays RL-213 and RL-214 and the resistors R-44 to R-76, inclusive. The thyratrons G-8 and G-9 are sometimes referred to as selector thyratrons.

The selector plate (Fig. 8b) functions as follows: Positive potentials (impulses) are supplied from Storage Plate No. 1 (secondary card data) to the control grids of the selector thyratron G-8 and the vacuum triode V-8a simultaneously via rectifier RC-1, resistors R-45 and R-66 (to G-8) and resistors R-48 and R-63 (to V-8a). Similarly positive potentials (impulses) are supplied from Storage Plate No. 3 (primary card data) to the control grids of the selector thyratron G-9 and the vacuum triode V-8b via rectifier RC-2, resistors R-56 and R-59 (to G-9) and resistors R-53 and R-62 (to V-8b). V-8a is biased to cut off via the voltage divider R-49 and R-64, and V-8b is similarly biased by the voltage divider R-52 and R-61. G-8 is biased to be non-conductive via the voltage divider R-46 and R-67, and G-9 is biased to be non-conductive via the voltage divider R-55 and R-58. The screen grid of the thyratron G-9 normally is biased (negative respective to cathode) via the voltage divider connected from line 202, normally positive 100 volts, to line 200, negative 45 volts) R-50, R-60, R-71, R-76, and the screen grid of thyratron G-8 is similarly biased by a corresponding voltage divider R-51, R-65, R-70, R-76. G-10 is biased to be non-conductive via application of the potential of line 200 (negative 45 volts) to its control grid via resistors R-72 and R-74, and G-11 is similarly biased via the resistors R-73 and R-75. Normally, therefore, the thyratrons G-8, G-9, G-10, and G-11 and the vacuum tubes V-8a and V-8b are not conducting.

When a positive potential is supplied to RC-1 from the Read Out Distributor of Storage Plate No. 1 (secondary card data) unaccompanied by a similar potential supplied to RC-2 from the Read Out Distributor of Storage Plate No. 3, the control grids of G-8 and V-8a become positive, and V-8a becomes conductive, thereby increasing the negative bias on the screen grid of G-9 via its anode connection. Since the screen grid of G-8 remains negative, G-8 will not become conductive. When the Clamp Emitter (Figs. 8d, 9a, and 9b) suddenly increases the positive potential of line 202, the screen grid of G-8 becomes positive and G-8 becomes conductive. V-8a, also having its anode tied to line 202, increases its anode current, thereby further increasing the negative bias on the screen grid of G-9 to prevent the latter from becoming conductive. When G-8 becomes conductive, its anode current energizes relay RL-213 and the RL-213a contacts are closed.

Similarly, when a positive potential is supplied to RC-2 from the Read Out Distributor of Storage Plate No. 3 (primary card data), unaccompanied by a similar potential supplied to RC-1 from the Read Out Distributor of Storage Plate No. 1, G-9 becomes conductive, G-8 is held non-conductive through similar control of its screen grid by the vacuum tube V-8b, and relay RL-214 is energized to close the RL-214a contacts.

When positive potentials are received simultaneously at RC-1 and RC-2 both G-8 and G-9 are held non-conductive by the control of their screen grids respectively by V-8b and V-8a, in the manner just described.

When G-8 becomes conductive it remains in that state until another primary card feed or secondary card feed occurs, whereupon the cam contacts P-6 or S-5 open, or until a positive potential causes G-9 to become conductive thereby momentarily lowering the potential upon the capacitor C-4, which in turn lowers the anode potential of G-8 to a value below the ionizing potential of the thyratron, thereby rendering G-8 non-conductive. The thyratron G-9 is affected similarly relative to being rendered non-conductive when thyratron G-8 becomes conductive.

From the above it may therefore be stated that:

(1) When RC–1 and RC–2 receive simultaneous positive potentials from their associated storage plates neither G–8 nor G–9 become conductive and the relays RL–213 and RL–214 are not energized to close their respective contacts RL–213a and RL–214a.

(2) When RC–1 receives a positive potential from its associated storage plate, and RC–2 receives none, G–8 becomes conductive, G–9 becomes (or remains) non-conductive, relay RL–213 is energized to close its contacts RL–213a.

(3) When RC–2 receives a positive potential from its storage plate, and RC–1 receives none, G–9 becomes conductive, G–8 becomes (or remains) non-conductive, relay RL–214 is energized to close its contacts RL–214a.

(4) Unless material or circuit failures occur, it is impossible for both G–8 and G–9 to become conductive simultaneously.

Referring now to Fig. 8b, particularly with respect to the selector thyratrons G–10 and G–11, certain wiring connections are provided in Selector Plate No. 1, for example, in order to establish certain groups of character representations with precedence over certain other groups; namely, alphabetical characters over numerical characters or vice versa. For purposes of clarity herein, when alphabetical characters have precedence, reference will be made to "alphabet high" and when numerical characters have precedence, reference will be made to "numbers high." For "alphabet high" a connection is made between CP1 and CP2, and another connection is made from the common line between contacts RL–213a and RL–214a to the post labelled "Alph. High" (Fig. 8d). These connections may be plugwires. For "numbers high" the connection from CP1 to CP2 is omitted, and a connection is made from the common line between contacts RL–213a and RL–214a to the post labelled "Nos. High" (Fig. 8d).

The circuit of Selector Plate No. 1, shown connected for "alphabet high," functions as follows: Assuming primary and secondary cards to be fed with the top edge leading (as per card shown in Fig. 3), when alphabetic data is read out from the storage plates through either RC–1 or RC–2, as a result of perforations in the "X," "Y," or "Z" index positions of the cards, either relay RL–213 or relay RL–214 will be energized to close its respective points. By the time the "0" index position is read out either contacts RL–213a or RL–214a will be closed thereby establishing circuits from CR–3 (see Fig. 8d), which is made at the "0" index position of the card, to the grids of selector thyratrons G–10 and G–11. Positive pulses are thereby provided to render G–10 and G–11 conductive whereupon their anode potentials fall, placing negative potentials on the grids of the vacuum tubes V–8a and V–8b and on the grids of thyratrons G–8 and G–9 for the remainder of the read out cycle. The thyratrons G–8 and G–9 are thereby prevented from responding to any pulses, which might arise due to the presence of numerical data during the rest of that cycle of operation.

The circuit of Selector Plate No. 16, shown connected for "numbers high," functions as follows: Assuming cards to be fed as discussed in the preceding paragraph, when alphabetical data is read out from the storage plates through either RC–1 or RC–2, as a result of perforations in the "X," "Y," or "Z" index positions of the cards, the thyratron G–20 or G–21 will fire and either relay RL–215 or RL–216 will be energized to close its respective points. For a period until the "0" index position is read out, while CR–13 (Figs. 9a and 9b) is made, a circuit is established either via contacts RL–215a or RL–216a to place a positive potential on the grid of either the thyratron G–22 or G–23, thereby rendering it conductive and causing its anode potential to be lowered so that the grid of either the vacuum tube V–9a or V–9b and the grid of either selector thyratron G–20 or G–21 are maintained at a negative potential for the rest of the read out cycle. Consequently when the selector thyratron G–20 or G–21, which has not been made conductive, is rendered conductive thereafter by a positive potential arising due to the presence of numerical data, the other selector thyratron will become extinguished by the action of the capacitor C–13 and will be unable to respond to any further impulses during the remainder of that cycle of operation.

Consequently, by means of the arrangement of circuits, as shown, each selector plate is capable of being operated with either alphabetic or numerical data predominating. For "alphabet high" the selector thyratron last energized from potentials read out from a storage plate, corresponding to the index positions X, Y, or Z, will retain control, and all following potentials corresponding to numerical index positions 0, 1, 3, and 5 will be suppressed so that alphabetic data predominates. For "numbers high" the selector thyratron first energized from potentials read out from a storage plate, corresponding to the index positions X, Y, or Z, will lose control, and its cooperating selector thyratron will take over control in response to following potentials, corresponding to the numerical index positions 0, 1, 3, and 5, so that numerical data predominates.

With reference to thyratrons G–10 and G–11 (Fig. 8b), at the end of each read out cycle (corresponding to the card sensing cycle from which the data read out arises) these thyratrons are extinguished by the opening of the contacts RL–212a and RL–212b, similarly thyratrons G–22 and G–23 are extinguished by the opening of the contacts RL–217a and RL217b. The relay RL–212 and the relay RL–217 are controlled by the circuit breakers P–5 and S–4 and the contacts RL–19a and RL–19b (see Fig. 7a) previously described. The other selector plates are similarly controlled via relays RL–X shown in Fig. 7a as RL–P–X and RL–H–X.

In addition to the selector plates discussed above, there are sixteen sequence plates provided in the present invention for the purpose of comparing primary data between the primary brushes 66 and the primary sequence brushes 65 (see Fig. 8a). Fig. 8c illustrates diagrammatically two sequence plates (Seq. Plate No. 1 and Seq. Plate No. 16) which are typical of all such plates. Essentially the sequence plate is the equivalent of the selector plate; however, it also serves to provide storage for data to be compared and consequently operates independently of the aforementioned storage plates 76 (of Fig. 8a). Functionally the sequence plate differs from the selector plate in that the latter operates from data read out from storage plates, while the former operates from data sensed directly from the primary cards as they are fed under the primary and primary sequence brushes. By way of example, Sequence Plate No. 1 (Fig. 8c), which physically resembles a selector plate plus the addition of two thyratrons, is comprised of: two vacuum tubes V–10a and V–10b; six thyratrons G–12, G–13, G–14, G–15, G–16, G–17; thirty-nine resistors R-80, R-81, and R-83 to R-119 inclusive, five capacitors C-8 to C-12, and the relays RL-222 and RL-223. The thyratrons G-12 and G-13 serve to store data impulses derived from a primary record card, the thyratrons G-14 and G-15 function as selector thyratrons, and the thyratrons G-16 and G-17 are utilized in connection with alphabetical-numerical control, while the vacuum tubes V-10a and V-10b act in conjunction with thyratrons G-14 and G-15 for comparing data impulses.

For purposes of illustration, let it be assumed that a column in a primary card is being sensed by the primary brushes corresponding to column 16 of Deck B, Fig. 3, and a column of another primary card following is being sensed by the primary sequence brushes corresponding to column 21 of Deck B, Fig. 3. Let the terminal SQ1 (Fig. 8c) be connected to a primary brush 66 (Fig. 8a) and the terminal SQ2 (Fig. 8c) be connected to a primary sequence brush 65 (Fig. 8a). Also let CP6 be connected to CP5 and the common line between relay contacts RL-222a and RL-223a (see Fig. 8c) be connected with the Alph. High post of Fig. 8d so that alphabetical data is predominating. Now with reference to Fig. 8c, as the cards are fed, a positive potential is supplied to SQ2 as the "Z" index position of the card under the primary sequence brush 65 is sensed. (SQ1 receives no potential until later.) The thyratron G-13 becomes conductive via a positive potential on its grid, and its anode current through resistor R-97 and resistor R-94 causes positive potentials to be applied to the grids of G-15 and V-10b so that when the Clamp Emitter (Fig. 8d) raises the screen grid potential of G-15 to a positive value the thyratron fires and relay RL-223 becomes energized to close contacts RL-223a. Shortly thereafter (see Fig. 9a and Fig. 9b) the potential on line 201 is reduced to zero by the making of the Brush Storage Dropout (see Fig. 8d) and G-13 is extinguished. G-15 remains conducting and when CR-3 makes a circuit is established to fire thyratron G-17 and thyratron G-16 (via CP6 and CP5 connection). The control grids of V-10a and G-14 are held negative due to the drop in G-16 anode potential. Similarly the control grids of V-10b and G-15 are held negative due to the drop in G-17 anode potential so that when G-13 next becomes conductive at the "3" index position the potential drop across the resistors R-94 and R-97 will be insufficiently positive with respect to the control grids of V-10b and G-15 to overcome the negative potential then existing. Similarly when G-12 becomes conductive at the "0," "1," and "5" index positions, the potential drop across resistors R-86 and R-89 will be insufficiently positive to overcome the negative potentials existing on the control grids of G-14 and V-10a respectively. Consequently neither V-10a, V-10b, G-14, nor G-15 can be active again for the remainder of the cycle. G-15 remaining conductive for the rest of the cycle keeps control via relay RL-223 and alphabetic data predominates.

Sequence Plate No. 16, Fig. 8c, may be used to illustrate numerical predomination. Let it be assumed therein that SQ3 is connected to a primary brush 66 (Fig. 8a) and that SQ4 is connected to a primary sequence brush 65 (Fig. 8a). The common line between the contacts RL-224a and RL-225a is also assumed to be connected to the post labelled Nos. High in Fig. 8d. Assuming the same columns in primary cards to be compared as in the immediately preceding paragraph, the thyratron G-25 will receive a positive potential on its control grid via SQ4, as the primary card is sensed by the primary sequence brush at the "Z" index position, rendering it conductive. Load current of G-25 flowing through resistors will thereupon cause V-11b and G-27 to conduct, G-27 remaining conductive. G-29 will be fired via CR-13, which is made (see Figs. 9a and 9b), through the relay contacts RL-225a, relay RL-225 being energized by G-27. The drop in anode potential of G-29, which remains conductive, will place negative potentials upon the control grids of V-11b and G-27 so that any further positive pulses received thereby will be incapable of rendering them conductive, such as when the "3" index position of the card is sensed by the primary sequence brush, firing the thyratron G-25 which is extinguished after each firing by the Brush Storage Dropout (Fig. 8d). When the "0" index position of the primary card being fed under the primary brush 66 is sensed, a positive potential is applied to the control grid of thyratron G-24 which fires and applies a positive potential to the control grids of V-11a and G-26, the latter remaining conductive after the Clamp Emitter pulse permits it to conduct and thereby energize relay RL-224, at the same time extinguishing G-27 via the capacitor C-14. G-24 is subsequently deionized via the Brush Storage Dropout (Fig. 8d) and again rendered conductive by a positive potential via SQ3 as the "1" index position is sensed by the primary brush 66. Since G-26 is already conductive when G-24 is fired only V-11a responds to the positive potential thereby produced upon the control grids of V-11a and G-26 in a manner as previously explained. G-26 remains conducting, however, and relay RL-224 remains energized so that numerical data predominates in this instance. Similar action occurs when the "5" index position is sensed by the primary brush 66.

The comparing circuits utilized in the selector plates and in the sequence plates previously discussed are also capable of comparing like data quantitatively, e. g. alphabetic versus alphabetic or numeric versus numeric. Briefly, and with respect to the Selector Plate No. 1, see Fig. 8b, let it be assumed that a primary card column corresponding to column 16, Deck A is compared with a secondary card column corresponding to column 21, Deck A (see Fig. 3), G-8 receiving secondary card data with G-9 receiving primary card data. With Alph. High connection and CP-1 connected to CP-2 neither G-8 nor G-9 will become conductive as their respective cards are sensed at the "Z" index position common to both, and since neither G-8 nor G-9 is conductive when CR-3 is made neither G-10 nor G-11 becomes conductive. When the "0" index position is sensed in the primary card, there being no corresponding position sensed in the secondary card, G-9 becomes conductive. G-9 remains conductive for the remainder of the cycle since the sensing in both cards of their respective "3" and "5" index positions produces no further change and relay RL-214 closes its points thereby controlling the card feed mechanism with the primary card high. With Nos. High connection, since both the primary and secondary cards contain similar zone designations, neither G-8 nor G-9 becomes conductive, and thereafter the cards are compared as with the Alph. High connection, the primary card causing G-9 to become conductive as the "0" index position is sensed, and the "3" and "5" index positions common to both cards producing no further control change, the primary card remaining high. Numeric data is compared with numeric data in a similar manner, there being no zone index positions sensed so that the cards are both sensed after their zone positions have passed their respective sensing brushes relative to any subsequent action affecting G–8 or G–9.

In connection with previously recounted operational features relative to the so called collating process, wherein, after a certain predetermined number of cycles of operation of the machine, the operation of the feed clutches via their respective clutch magnets (i. e. the primary clutch magnet 64, the secondary clutch magnet 60, and the eject clutch magnet 87) is taken over under control of the sensed data, certain functional relations are to be pointed out. These are:

a. A low primary reading, or a high secondary reading in a selector plate, actuates the primary feed clutch.

b. A low secondary reading, or a high primary reading in a selector plate, actuates the secondary feed clutch.

c. An equal reading in a selector plate combined with an equal reading in a corresponding sequence plate actuates the primary feed clutch.

d. An equal reading in a selector plate combined with a high primary sequence reading in a sequence plate actuates both the primary and secondary feed clutches.

e. The eject feed clutch may be actuated with either the primary or the secondary feed clutch, depending upon the operation being performed.

As has been previously explained certain of the cam contacts of the present invention correspond in equivalency to certain cam contacts of the patent of reference, i. e. U. S. 2,379,828. Cam contacts P–2, P–3, S–2, S–3 (see Fig. 8d), for example, are equivalent to cam contacts PC–2, PC–3, SC–2, SC–3 (see Fig. 1b of reference patent) respectively, and function to control energization of the relays R–8 to R–16 of the reference patent, relays RL–226 and RL–227, respectively, in the present invention corresponding to relays R–10 and R–11. In order that relays RL–226 and RL–227 may be picked up quickly by positive voltage pulses applied to YI and XI plughubs, respectively, the thyratrons G–18 and G–19 are provided. The energizing and holding circuits thereby provided are unique in the manner in which these thyratrons are applied. Let the circuit applicable to thyratron G–18 (Fig. 8d) be presumed to receive a positive pulse at YI when cam contacts S–3 are closed, resulting in the thyratron G–18 becoming conductive and picking up relay RL–226. By consulting the timing chart (Figs. 9a and 9b) it will be determined that the cam contacts S–2 are always closed when cam contacts S–3 are closed, consequently when relay RL–226 closes its "a" contact the thyratron G–18 will become extinguished and relay RL–226 will be held through its "a" contact until S–2 opens, the thyratron G–18 being conditioned automatically thereby to be responsive to a succeeding pulse. The thyratron G–19 functions similarly with respect to plughub XI, cam contacts P–2 and P–3, and relay RL–227. Plughubs YI and XI correspond to the plughubs SXPU and PXPU of Fig. 1b of the reference patent, while the arrows designated in Fig. 8d of the present invention by YO and XO provide connections respectively to relays R–8, R–9, R–10 and R–11, R–12, R–13, R–14, R–15, R–16 of the reference patent.

All of the above mentioned functional operations are covered in the reference patent, and these may be performed similarly in a machine of the class described equipped with the features of the present invention. By way of example, however, an operation wherein the secondary feed clutch is actuated to feed a secondary card as a result of reading a low secondary card in Selector Pate No. 1 is chosen. Let it be assumed that the data has been sensed from both a primary card and a secondary card and stored in the appropriate storage plates associated with Selector Plate No. 1. Let it also be assumed that data, both primary and secondary is read out and compared in the said selector plate and that as a result the thyratron G–9 in Fig. 8b is conductive at the end of the card cycle due to the primary card data being higher than that of the secondary card. The relay RL–214 will become energized when G–9 is conductive. Now, referring to Fig. 7b, it is apparent that the relay RL–24 (corresponding to relay R–24 of the reference patent) will be energized via line 169 (corresponding to line WI in the reference patent), relay RL–24, contacts RL–38b, contacts RL–214b (now transferred), contacts RL–213b, contacts RL–216b, contacts RL–215b, plughub PH–6, via plugwire to plughub PH–7, to CR–2 (see reference patent Fig. 1d) and to the other line 170 (not shown in Fig. 7b, but corresponding to line W2 in Fig. 1c of the reference patent). Operation of contacts of relay R–24 in the reference patent will cause the secondary feed magnet SFM in Fig. 1c of that patent to become energized to produce a secondary card feed. Similarly RL–22 (corresponding to relay R–22 in the reference patent) will be energized when a low primary designation is sensed in a selector plate to cause a primary card feed, while if the primary designation and secondary designation, which are sensed, are equal the relay RL–23 (R–23 of reference) will be energized. Likewise the relays RL–25, RL–26, and RL–27 (see Fig. 7c) will become energized under control of the contacts RL–222b, RL–223b, RL–224b, and RL–225b as a result of relays RL–222, RL–223, RL–224, and RL–225 operating in the sequence plates when differences occur between primary cards at the primary and primary sequence sensing stations. In other words the Selector Plate Contacts of Fig. 7b may be said to replace the Selector Unit of Fig. 1d of the reference patent, and the sequence Plate Contacts of Fig. 7c may be said to replace the Sequence Unit of the reference patent.

In order that a check of the conditions of comparison in selector and sequence plates may be made, additional contacts are provided for the relays RL–213, RL–214, RL–215, RL–216 and RL–222, RL–223, RL–224, RL–225 corresponding to the contacts "c" in Fig. 10. These contacts are arranged in a circuit together with a plurality of neon lamps grouped in a block 180 (see Fig. 4) and connected to operate so that when a low secondary designation is sensed in Selector Plate No. 1, for example, a neon bulb corresponding to that selector plate marked "L. S." will be lighted by the operation of relay RL–214 and the closing of the contacts RL–214c which establishes a circuit between 110 volt line 197, neon lamp L. S. of Selector Plate No. 1, contacts RL–214c, contacts RL–213c, contacts RL–216c, contacts RL–215c, to CR–2 which leads to line W2 of the reference patent (W2 corresponding to line 170 of Fig. 7a of the present invention and line 170 being connected to line 198, the other side of the 110 volt line). For equal conditions in the selector and sequence plates the neon lamps "EQ" and "EG2P" respectively, remain lighted.

Parameters for the circuits shown in Figs. 8a, 8b, 8c, and 8d relative to electronics devices, resistors, and capacitors are as follows:

G1 to G-7—Western Electric Co. cold cathode gas triode 359-A.
G-8 to G-29—R. C. A. thyratron 2D21.
V-1, V-2, V-3, V-4—R. C. Pentode 6L6.
V-5 and V-6—R. C. A. twin triode 6SN7.
V-7—R. C. A. pentode 6SJ7.
V-8, V-9, V-10, V-11—R. C. A. twin triode 6J6.
N-1—G. E. Co. 5 watt neon lamp.
C-9, C-11—.005 mfd.
C-2, C-3, C-5, C-6, C-7, C-10, C-12—.01 mfd.
C-1, C-4, C-8, C-13, C-14—.2 mfd.
R-1, R-2, R-3, R-4—50 ohms.
R-62, R-63, R-103, R-104—2000 ohms.
R-68, R-69, R-80, R-81, R-109, R-110, R-111, R-112—5000 ohms.
R-35a, R-43—6800 ohms.
R-9, R-13, R-35b, R-36, R-37, R-38, R-39, R-40, R-41, R-42, R-44, R-47, R-54, R-57, R-60, R-65, R-85, R-88, R-95, R-98, R-101, R-106—10,000 ohms.
R-45, R-48, R-53, R-56, R-86, R-89, R-94, R-97—15,000 ohms.
R-74, R-75, R-117, R-118—22,000 ohms.
R-58, R-61, R-64, R-67, R-99, R-102, R-105, R-108—39,000 ohms.
R-50, R-51, R-91, R-92—40,000 ohms.
R-6, R-12, R-70, R-71, R-76, R-113, R-114, R-119, R-120, R-121—50,000 ohms.
R-28, R-29, R-30, R-31, R-32, R-33, R-34, R-59, R-66, R-72, R-73, R-77, R-78, R-79, R-83, R-84, R-100, R-107, R-115, R-116—51,000 ohms.
R-46, R-49, R-52, R-55, R-87, R-90, R-93, R-96—83,000 ohms.
R-7, R-11—100,000 ohms.
R-8—200,000 ohms.
R-14, R-15, R-16, R-17, R-18, R-19, R-20, R-21, R-22, R-23, R-24, R-25, R-26, R-27, R-28—470,000 ohms.
R-10—500,000 ohms.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled machine having a pair of electrical sensing elements for sensing designations concurrently in a pair of record card columns, a circuit comprising two identical portions each consisting of a first gaseous discharge device, a second gaseous discharge device, and an electron discharge device, means to bias each said device normally to be non-conducting, said first gaseous discharge device and said electron discharge device having a common input for responding to become conductive to a common potential applied thereto, a work circuit for each said first gaseous discharge device, the said work circuits becoming energized responsive to their respective gaseous discharge devices becoming conductive, a control circuit from each electron discharge device in one said portion to a first gaseous discharge device in the other said portion effective to prevent conducting in the latter concurrent with the former, a circuit from each second gaseous discharge device in one portion to the common input of the said devices in the same portion effective to render the latter devices non-responsive to become conducting when the former is conducting, means under control of each said work circuit effective to render the corresponding said second gaseous discharge device in that said portion conductive, and a circuit from each said sensing element to one of said inputs effective upon sensing of a designation to provide a potential to render the respective electron discharge device and first gaseous discharge device conductive.

2. In a record controlled machine having a pair of electrical sensing elements for sensing designations concurrently in a pair of record card columns, a circuit comprising two identical portions each consisting of a first gaseous discharge device, a second gaseous discharge device, and an electron discharge device, means to bias each said device normally to be non-conducting, said first gaseous discharge device and said electron discharge device having a common input for responding to become conductive to a common potential applied thereto, a work circuit for each said first gaseous discharge device, the said work circuits becoming energized responsive to their respective gaseous discharge devices conducting, a control circuit from each electron discharge device in one said portion to a first gaseous discharge device in the other said portion effective to prevent conducting in the latter concurrent with the former, a circuit from each second gaseous discharge device in one portion to the common input of the said devices in the same portion effective to render the latter devices non-responsive to become conducting when the former is conducting, means under control of each said work circuit effective to render the said second gaseous discharge devices in both said portions conductive, and a circuit from each said sensing element to one of said inputs effective upon sensing of a designation to provide a potential to render the respective electron discharge device and first gaseous discharge device conductive.

3. A voltage discriminating circuit comprising two identical portions each consisting of a vacuum tube and a gas tube having their input electrodes connected in common, means for biasing the said tubes to be normally non-conducting, a second means for biasing the said gas tubes but not the said vacuum tubes, work circuits for the said gaseous tubes, a connection from each said vacuum tube in one said circuit portion to the gas tube in the other said circuit portion effective to retain the latter said tube non-conducting when the former said tube conducts, means for applying potentials to the common inputs in either portion to overcome the first said biasing means to cause the said vacuum tubes to conduct, and means for rendering ineffective the second said biasing means while the said potentials remain applied to the said common inputs to cause the said gaseous tubes to conduct under control of the said vacuum tubes.

4. In a record controlled machine for sensing record cards having index positions marked to indicate data, an electrical sensing element, means to feed a record card in timed relation past the said element, a gaseous discharge device having an anode, a cathode, and a control electrode, a work circuit including an electromagnet in the cathode-anode circuit of the said device, a source of E. M. F. connected in the said work circuit for energizing the said electromagnet when the said device conducts, the voltage provided thereby being less than the breakdown voltage of the said device, a source of E. M. F. connected with the said sensing element for providing a potential therefrom when a marked position is sensed, means operating in timed relation with the said feeding means for delivering the said potential to the cathode-control electrode circuit of the said device to render it conductive, a pair of contacts operable by the said electromagnet to connect the cathode to the anode of the said device for extinguishing the same and thereby retain the said electromagnet energized, and means operating in timed relation with the said feeding means for removing the first said source of E. M. F.

5. In a collator for distributing record cards having combinationally arranged data designations at index positions in columns therein representative of values according to a prescribed sequence, means to feed said cards in two different paths, means for electrically sensing the designations in a pair of said record cards, one being fed in each said path, a plurality of electronic storage means controlled by the said sensing means becoming selectively conductive in accordance with the designations in each of the said pairs, electronic comparing means including a pair of identical circuits each including a first gaseous discharge device, a second gaseous discharge device, and an electron tube, a work circuit for each first gaseous device energized when the device is conducting, means to derive and apply potentials from the said storage devices to the said comparing means for rendering conductive the said electron tubes, connections from each said electron tube to a corresponding first gaseous device to render the device concurrently conductive, connections from each said electron tube to a non-corresponding first gaseous device to prevent its conducting concurrently with the said non-corresponding electron tube, connections between corresponding said first and second gaseous devices for preventing the first said device from becoming conducting when the second said device is conducting, means for rendering the second said devices conductive in timed relation with the said feeding means whereby certain of the potentials derived and applied from the said storage means are rendered ineffective to render a first said gaseous device conductive so that its associated work circuit is not energized, and means operating under the control of the said work circuits for selectively distributing the record cards in the said paths to record card destinations in accordance with a sequence varying from the said prescribed sequence in a manner corresponding to the energization of the said work circuits.

6. In a record controlled machine, means for sensing a record card having data designations at index point positions therein, means to feed a card past the sensing means, a plurality of electronic trigger devices, one such device for each said index position, a circuit from the said sensing means to each of the said devices whereby a voltage pulse is provided, a circuit breaker in the said circuit for limiting each of the said pulses to a predetermined duration corresponding to a said index position, and a distributor having a connection to each of the said devices for providing additional voltage pulses coincident in time relation with the first said pulses whereby a said trigger device is made conductive.

HANS P. LUHN.
BIAGIO F. AMBROSIO.
KENNETH W. DEAN.

REFERENCES CITED

The following references are of record in the file of this patent:

UNITED STATES PATENTS

| Number | Name | Date |
|---|---|---|
| 2,056,301 | Schroter | Oct. 6, 1936 |
| 2,124,848 | Powell | July 26, 1938 |
| 2,140,355 | Gulliksen | Dec. 13, 1938 |
| 2,162,508 | Knowles | June 13, 1939 |
| 2,189,024 | Bryce | Feb. 6, 1940 |
| 2,299,272 | Hallden | Oct. 20, 1942 |
| 2,328,671 | Pfleger | Sept. 7, 1943 |
| 2,379,828 | Rubidge | July 3, 1945 |
| 2,400,574 | Rea et al. | May 21, 1946 |